United States Patent [19]
Lee

[11] Patent Number: 5,410,361
[45] Date of Patent: Apr. 25, 1995

[54] CHANNEL SELECTION METHOD WITH REDUCED MEMORY USAGE

[75] Inventor: Sang-soo Lee, Suwon, Rep. of Korea

[73] Assignee: Samsung Electronics Co., Ltd., Kyungki-do, Rep. of Korea

[21] Appl. No.: 111,875

[22] Filed: Aug. 26, 1993

[30] Foreign Application Priority Data

Aug. 26, 1992 [KR] Rep. of Korea ............... 92-15428

[51] Int. Cl.⁶ .............................................. H04N 5/50
[52] U.S. Cl. ..................... 348/570; 348/731; 455/185.1
[58] Field of Search ............... 348/734, 731, 569, 570; 455/185.1, 186.1, 186.2, 154.1, 154.2, 158.1; H04N 5/445, 5/50; 358/192.1

[56] References Cited

U.S. PATENT DOCUMENTS

| | | | |
|---|---|---|---|
| 4,763,195 | 8/1988 | Tults | 455/186.2 |
| 5,144,438 | 9/1992 | Kim | 358/183 |
| 5,299,010 | 3/1994 | Nakazawa et al. | 348/570 |
| 5,301,028 | 4/1994 | Banker et al. | 455/185.1 |

FOREIGN PATENT DOCUMENTS

| | | | |
|---|---|---|---|
| 5-236369 | 9/1993 | Japan | H04N 5/445 |
| 2221363 | 1/1990 | United Kingdom | H04N 5/50 |

*Primary Examiner*—James J. Groody
*Assistant Examiner*—Jeffrey S. Murrell
*Attorney, Agent, or Firm*—Sughrue, Mion, Zinn, Macpeak & Seas

[57] ABSTRACT

A channel selection method stores broadcast channel numbers for which broadcast signals are input and displays the stored broadcast channel numbers on a screen, thereby facilitating broadcast channel selection. The method comprises the steps of storing the number of a corresponding channel by sequentially scanning broadcast signal channels, displaying the numbers of all the channels scanned in the storage step so as to be able to distinguish the stored channel numbers from unstored channels numbers, and selecting a channel using only a channel number stored in the storage step from among the displayed channel numbers. Accordingly, the broadcast channels can be identified with ease, permitting a desired channel to be easily selected.

11 Claims, 6 Drawing Sheets

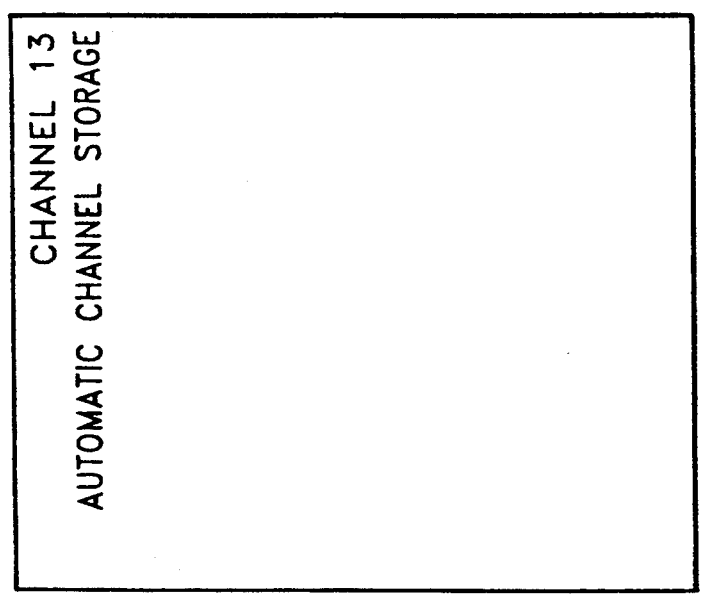

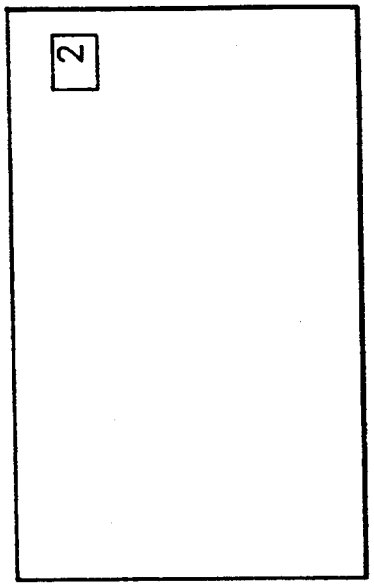

CHANNEL SELECTION METHOD WITH REDUCED MEMORY USAGE

BACKGROUND OF THE INVENTION

1. Field of the Invention

The present invention relates to a television broadcast selection method and, more particularly, to a channel selection method capable of facilitating channel selection by storing broadcast channels and displaying the stored broadcast channels on a screen.

Korean Patent Application No. 92-15428 is incorporated herein by reference for all purposes.

2. Description of the Prior Art

In one conventional channel storage method used in conjunction with a color television, a memory device is simply used for storing and erasing particular channels in response to operation of a storage key and an erase key. According to this method, the channel is then selected using an up/down key or similar channel selection key. It should also be noted that in the color television implementing this method, an automatic program key must be separately provided. Operation of the automatic program key permits automatic detection of broadcast channels by way of signal presence detector so that detected broadcast signals may be stored in the memory and selected as above.

A more recent method of a conventional channel storage and selection method is described in U.S. Pat. No. 5,144,438, wherein the broadcast channel by which the broadcast signal can be input by operation of the above-described automatic program key is automatically selected and stored in a memory. At the same time, the video image of the corresponding channel is stored in a separate memory. Then, the channel selection is performed using a picture-in-picture (PIP) function, by which the main picture screen is divided into a plurality of sub-screens to display a plurality of broadcast channel signals.

However, when using either of the above methods, a user must continuously utilize the channel selection key to verify the stored channels. Also, since the average user typically has trouble with the procedure for storing and/or erasing of channels, the user tends to use only the up/down key to select a desired channel out of all the available channels.

Moreover, when using the PIP function, since the respective video images of the broadcast programs in the respective broadcast channels are displayed in a plurality of sub-screens on the main screen, channel selection is very convenient. However, since this requires a separate apparatus for performing the PIP function, production cost increases and the overall structure becomes more complicated.

The present invention was motivated by a desire to overcome the above-mentioned disadvantages in the prior art.

SUMMARY OF THE INVENTION

The principal purpose of the present invention is to provide a method capable of selecting a desired channel by automatically scanning channels having output signals and displaying the scanned channels on a screen.

Accordingly, it is an object of the present invention to provide a channel selection method of enabling the easy viewing of which channels are currently stored, by simultaneously displaying the stored channels and unstored channels when displaying all the channels on a screen after performing an automatic programming function.

These and other objects, features and advantages of the invention are provided by a method for selecting television broadcast channels comprising the steps of:
storing a channel number of a corresponding channel by sequentially scanning each of a plurality of broadcast signal channels and identifying each of the broadcast signal channels corresponding to an input channel;
displaying all the channel numbers scanned in the storage step on a screen, and distinctively displaying the stored channel numbers and the unstored channels numbers at the same time; and
selecting a channel using only a number stored in the storage step from among the channel numbers displayed on the screen.

The above displaying step for displaying the stored channel numbers so as to be distinguished from the unstored channel numbers may comprise the steps of superimposing the stored channel number with a bar of a predetermined color and sequentially displaying the channel numbers superimposed with the color.

These and other objects, features and advantages of the invention are disclosed in or apparent from the following description of preferred embodiments.

BRIEF DESCRIPTION OF THE DRAWINGS

The preferred embodiments are described with reference to the drawings in which like elements are denoted by like or similar numbers and in which:

FIG. 2A shows an example of a display during the performance of an automatic programming function;

FIG. 2B shows an example of a display of a channel map after completion of the automatic programming function;

FIG. 2C shows an example of a display of a channel status when a status identification key is input;

FIG. 2D shows another example of a display of a channel status when a status identification key is input;

DETAILED DESCRIPTION OF THE INVENTION

Figure 1:
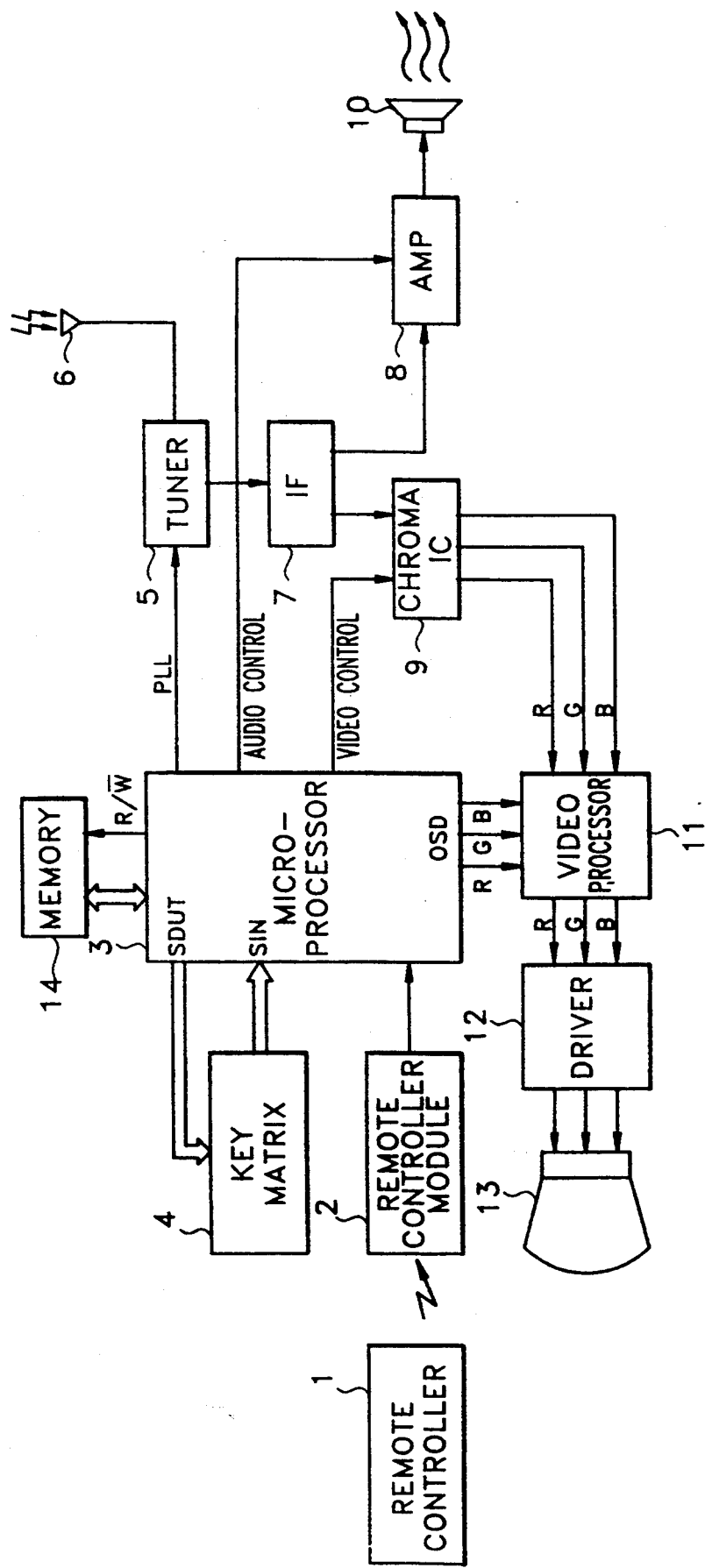
FIG. 1 is a schematic block diagram of a color television having a channel selection function according to the present invention.

FIG. 1 is a schematic block diagram illustrating a color television suitable for functioning in a manner which facilitates channel selection by displaying the stored channels using an on-screen display function according to the present invention.

In FIG. 1, the color television apparatus comprises a remote controller 1 and a remote controller module 2 which are used for remotely providing data or control instructions to a microprocessor 3, which controls the overall operation of the apparatus. Preferably, a key matrix 4 is connected to the body of the apparatus and can be used for providing an alternative means for data input, the entering of control instructions, etc. The color television apparatus advantageously includes a tuner 5 for selecting a broadcast signal input via an antenna 6 in response to data from microprocessor 3, an intermediate frequency amplifier 7 for amplifying the signal selected and output by tuner 5, a chroma integrated circuit (IC) 9 for processing a color signal and a video signal processor 11 for processing a signal to be displayed on the monitor 13 via a driver 12. Preferably, the intermediate frequency amplifier 7 provides a signal to an audio amplifier 8 and an audio output unit 10. In an exemplary case, microprocessor 3 is connected to a dedicated memory 14 for storing data.

The operation of the apparatus constructed as described above will be described immediately below.

A control signal is input to microprocessor 3 via either key matrix 4 or via the combination of remote controller 1 and remote controller module 2. Microprocessor processor 3 receives the input control signal and performs the various functions for controlling the television apparatus. If a particular channel key (not shown) is pressed using the keypad of remote controller 1 or key matrix 4, microprocessor 3 generates a phase-locked loop signal for controlling tuner 5 which thereby selects a television broadcast signal received via antenna 6. The signal selected by tuner 5 is applied to audio amplifier 8 and chroma IC 9 via intermediate frequency amplifier 7. The audio signal corresponding to the selected channel is externally output via speaker 10. The color signals R, G and B are processed in chroma IC 9 and then are applied to video processor 11, which processes the input television broadcast color signal and an on-screen display color signal, and then provides the video-processed signals for driver 12. Preferably, data corresponding to the on-screen display characters are provided to video processor 11 by microprocessor 3. Accordingly, the television broadcast signal and/or the on-screen display characters can be displayed on monitor 13. In an exemplary case, memory 14 stores the channel including a broadcast signal under control of microprocessor 3.

The above described operation is similar in both conventional color television apparatuses and a color television apparatus according to the present invention. However, in the present invention, once the channel data is completely stored, the desired channel is not simply selected by an up/down key or the like, using stored channels, but the stored channels are displayed on monitor 13 to thereby facilitate channel selection by means of the screen. This will be described below in more detail.

The general automatic programming function automatically detects broadcast signals on a given television or cable television channel, and if the broadcast signal is present, automatically stores the corresponding channel number in memory 14 and then repeats the above procedures for the next channel. Here, there are two methods for the detection process of the channel while increasing the channel number. According to a first method, the above detection process first performed for any channel at which an automatic program key is pressed. Then, the channel number is continuously increased up to a final channel number, and upon reaching the final channel, proceeds directly to the lowest channel and continues up from there until reaching the channel from which the automatic programming began. According to a second method, if the automatic program key is pressed, the tuner sets its frequency for the lowest channel number which is then continuously increased up to the final channel number. Either of the above channel detection processes can be used.

That is, microprocessor 3 determines if the automatic selection signal is input in accordance with an automatic program key or a multichannel scanning key from remote controller 1 or key matrix 4. Then, microprocessor 3 checks whether a horizontal sync signal is included in the broadcast signal input via the current channel or the lowest channel. Then, if the horizontal sync signal exists, the corresponding channel number is stored in memory 14. If the sync signal for the selected channel is not present, the channel number is increased an the process is repeated for the next channel number.

During performance of automatic programming, the audio is unnecessary and, therefore, microprocessor 3 sends an audio control signal to audio amplifier 8 to mute its output.

Also, if the user presses the automatic program key again, i.e., during the automatic programming function, the program stops and only the thus-far detected channel numbers are stored in memory 14. If the automatic programming is completed without thus being interrupted, all the channel numbers for which broadcast signals are received are stored in memory 14.

Microprocessor 3 then replicates the data recorded in memory 14. All the channels are simultaneously displayed on monitor 13, together with the video signal input. Here, for displaying channel numbers containing respective broadcast signals together with channel numbers without broadcast signals, the stored channel numbers are distinctively displayed alongside the channel numbers corresponding to the unstored channels.

For example, the channel numbers containing respective broadcast signals advantageously can be readily distinguished by superimposing a bar of a predetermined color for each of the stored channel numbers, or flashing the stored channel numbers by rapidly alternating or varying their colors. It will be appreciated that the distinction between stored and unstored channel number may be performed by many other methods without departing from the spirit and scope of the present invention.

It will be noted that if the automatic programming function is stopped by the user as described above, only the stored channels can be displayed on the screen.

Also, if a memory status identification key signal is input during the broadcast reception after performing the automatic programming function, the memory status is displayed. Accordingly, the user can see with ease which channels are stored and which are not by means of the on-screen display.

FIGS. 2A-2D show various display examples of displaying channels.

FIG. 2A shows an example of displaying channel number "13" during the automatic programming operation. Here, the channel number is stored in memory 14 by the programming operation of microprocessor 3.

FIG. 2B shows an example of displaying a channel map on monitor 13 when the automatic programming has been completely performed. Here, certain portions are displayed by varying the background and/or figure colors on the monitor, in order to distinguish the stored channels from those not stored. It will be appreciated that the arrangement of the channel map (or the memory status pattern) can be achieved in various ways. Also, such a display can be performed after being stored and for a predetermined time, say, ten seconds, and then removed from the screen. It will also be noted that this duration can be arbitrarily adjusted.

FIG. 2C shows a display example when a memory status identification key of remote controller 1 or key matrix 4 is pressed to identify a memory status in connection with the channels through which the broadcast signals are input during normal television operation. In this case, to distinguish a broadcast signal input channel from one not receiving a broadcast signal, the background color and figure color of the corresponding channel advantageously may be inverted.

Also, when the memory status identification key is pressed again, only the stored channels sequentially move up or down from the lowest channel as shown in FIG. 2D. Thus, in this case, if the user continuously presses the identification key, the channel number is changed in the sequence of, for example, 2→6→7→9→11→13→2, and are displayed. In FIG. 2D, the corresponding channel is displayed in the upper-right portion of the screen, and simultaneously, the channel's broadcast signal is displayed on the screen. The channel map of FIG. 2C may also be displayed, in an exemplary case, in the upper-left portion of the screen, and then, whenever the identification key is operated, a cursor moves to another broadcast signal input channel so that the broadcast signal of the corresponding channel number is displayed on the screen.

Figure 3:
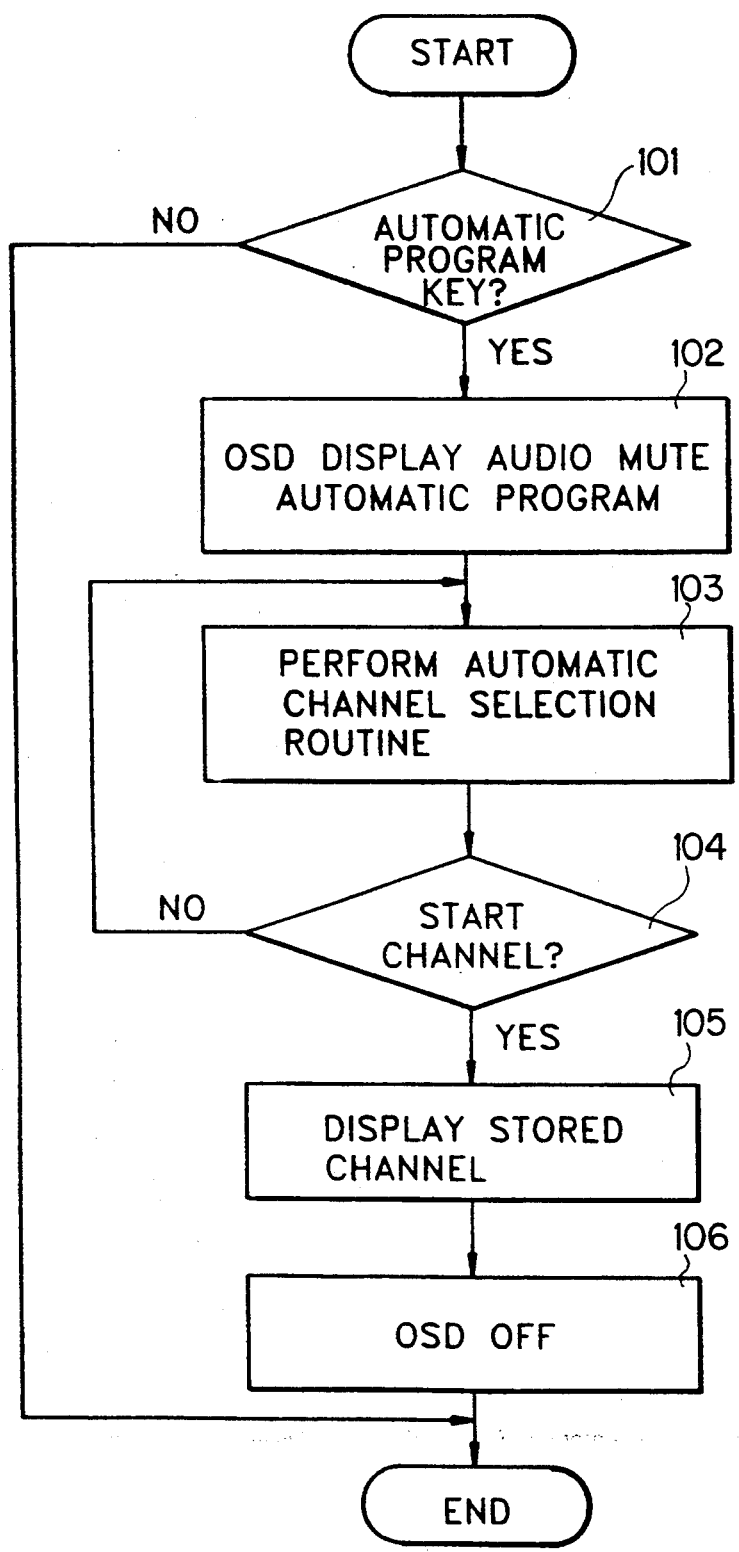
FIG. 3 is a flow chart showing a procedure for performing the automatic programming function.

FIG. 3 is a flow chart showing an operation process of a general automatic programming function. The operation of such an automatic programming function will be briefly described below.

Microprocessor 3 periodically checks the data input from key matrix 4 or remote controller 1, to determine whether data for instructing the automatic programming operation is input during step 101. If data input is detected, the audio signal is muted and then, optionally and for the convenience of the user, a character display informing the user that the automatic programming function is currently being performed is output to monitor 13 using the on-screen display function during step 102. The representation on monitor 13 indicating the execution of the automatic programming is to facilitate the use of automatic programming and can be omitted.

Microprocessor 3 performs an automatic channel selection routine to find the broadcast signal input channels among all the channels during step 103. A more detailed explanation of preferred steps of the channel selection routine is discussed while referring to FIG. 4.

The automatic channel selection routine determines whether the broadcast signal input through the corresponding channel exists during step 201. If so, program execution is delayed during step 202 for a predetermined time, e.g., about 150 milliseconds. If the broadcast signal does not exist in the corresponding current channel during step 204, that channel is skipped in step 203 and the channel number (CH) is incremented during step 206. Then, it is checked if the increased channel number is larger than the highest channel number step 207. If the former is larger than the latter, the automatic channel selection routine terminates and returns to the original routine shown in FIG. 3. On the other hand, if the former is equal to or less than the highest channel number, the automatic program returns to step 201 to repeat the previous procedure.

As previously discussed, even if it is determined that the broadcast signal is input at step 201, the existence of the broadcast signal is again checked after delaying it for about 150 milliseconds, for reliability, during step 204. Then, if the broadcast signal is still present, microprocessor 3 finally determines that the broadcast signal exists, and then instructs memory 14 to store the corresponding channel number therein during step 205. However, if the broadcast signal is not present after the delay provided by step 202, it is determined that the broadcast signal does not exist, and the current channel is not stored. Accordingly, the automatic program returns to step 203 and thus skips the current channel, as previously discussed.

Then, microprocessor 3 increases the current channel number by one during step 206, verifies the relationship between channel number CH and the final channel during step 207 and returns, if necessary, to step 201 to repeat the above-described procedure.

Figure 4:
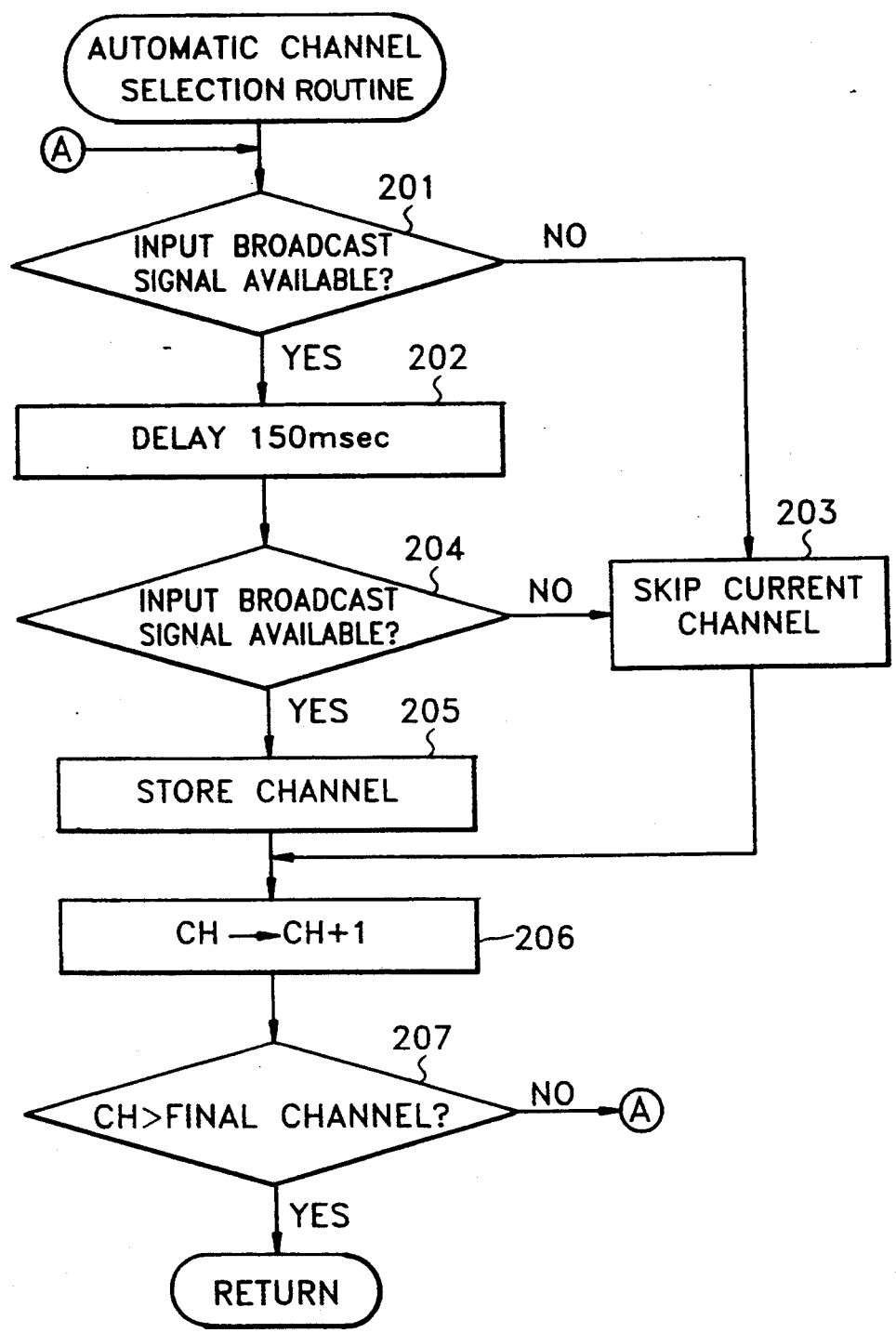
FIG. 4 is a flow chart of a subroutine for channel selection during the performance of an automatic programming function.

It will be noted that the automatic channel selection routine shown in FIG. 4 may be interrupted, in an exemplary case, by a second press of the key corresponding to the automatic programming function as discussed above. In that case, a step such as step 101 of FIG. 3 is performed after a negative response at step 207 is received but before step 201 is repeated.

After all the channels through which the broadcast signals are input are stored, the detecting of the lowest channel at step 104 tells microprocessor 3 that the channel storage operation has been completed. Program control passes to step 105, causing the microprocessor 3 to display the channel map, i.e., the stored and unstored channels of the receivable channels, so as to be distinguishable from each other on monitor 13. It will be appreciated that, if during the automatic programming operation, the starting channel is not the lowest channel but the channel being displayed when the automatic programming operation key is pressed, the above process stops the storage operation when the channel becomes the originally selected channel.

The display of the stored channels and the unstored channels is distinctively displayed for a predetermined time, e.g., about ten seconds, as shown in FIG. 2B, upon completion of the storage operation. The channel map display is removed from the screen after the prescribed time during step 106.

Figure 5:
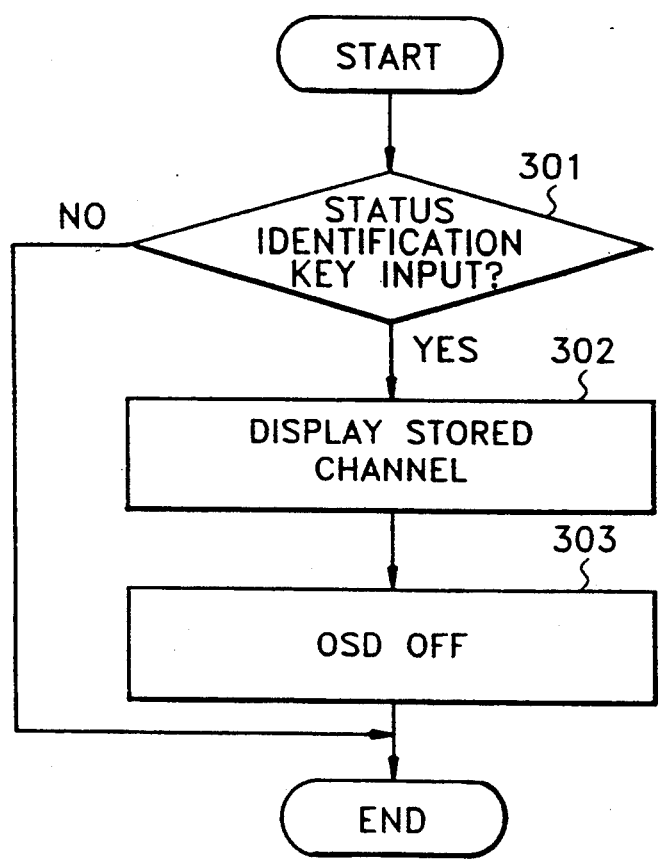
FIG. 5 is a flow chart for identifying the channel status.

FIG. 5 is a flow chart diagram for explaining an operation of microprocessor 3 when the user wishes to identify the stored channels at a normal state after completion of the channel storage. When the user inputs the status identification key signal during step 301, the stored channels are displayed on monitor 13 as shown in FIGS. 2C or 2D during step 302. The channels displayed on monitor 13 are displayed for a predetermined time and then removed from the screen during step 303.

As described above, the present invention performs an automatic programming function and then simultaneously and distinctively displays the stored channels and the unstored channels when all the channels are displayed on the monitor, thereby enabling the user to easily see the broadcast signal input channels and to then select the desired channel from the stored channels with ease.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of selecting a television broadcast channel comprising the steps of:
   (a) storing a channel number of a corresponding channel by sequentially scanning each of a plurality of broadcast signal channels and identifying each of said broadcast signal channels corresponding to an input channel;
   (b) displaying of all the channel numbers scanned in said storing step (a) and distinctively displaying respective stored channel numbers and unstored channel numbers at the same time; and
   (c) selecting a desired channel using only one of said stored channel numbers stored in storing step (a) from among said displayed channel numbers.

2. The channel selection method according to claim 1, wherein said displaying step (b) further comprises the step of (d) superimposing each of the stored channel numbers on a bar of a predetermined color.

3. The channel selection method according to claim 1, wherein said displaying step (b) further comprises the step of (e) superimposing each of the stored channel numbers on a bar of a predetermined color and flashing each of the stored channel numbers.

4. The channel selection method according to claim 1, wherein said selecting step (c) comprises the step of sequentially displaying the stored channel numbers on a screen one by one.

5. The channel selection method according to claim 1, wherein said storing step (a) comprises the step of storing a channel number of a corresponding channel by sequentially examining each of a plurality of broadcast signal input channels only until an automatic programming function is stopped by external manipulation.

6. A method of selecting a television broadcast channel comprising the steps of:
   (a) storing a plurality of channel numbers, each of said channel numbers having a corresponding indication that a respective broadcast signal for said each of said channel numbers exists;
   (b) displaying a channel map including all of said channel numbers, wherein said each of said channel numbers having an associated broadcast signal is distinctively displayed so as to permit identification of all active channel numbers; and
   (c) selecting a desired channel using only said channel map.

7. The channel selection method according to claim 6, wherein said displaying step (b) comprises the step of displaying a channel map including all of said channel numbers, wherein said each of said channel numbers having an associated broadcast signal is distinctively displayed by superimposing each of said active channel numbers on a bar of a predetermined color so as to permit identification of all of said active channel numbers.

8. The channel selection method according to claim 6, wherein said displaying step (b) comprises the step of displaying a channel map including all of said channel numbers, wherein said each of said channel numbers having an associated broadcast signal is distinctively displayed by flashing each of said active channel numbers on a superimposed bar of a predetermined color so as to permit identification of all of said active channel numbers.

9. The channel selection method according to claim 6, wherein said storing step (a) further comprises the steps of:
   (d) examining a tuner output corresponding to a respective one of said channel numbers N times, where N is an integer greater than 1, for an indication of the existence of said respective broadcast signal; and
   (e) storing all of said channel numbers having said indication that said respective broadcast signal for said corresponding one of said channel numbers exists.

10. The channel selection method according to claim 6, wherein said storing step (a) comprises the step of storing a plurality of channel numbers, each of said channel numbers having a corresponding indication that said respective broadcast signal for said each of said channel numbers exists until an automatic programming function is stopped by external manipulation.

11. The channel selection method according to claim 6, wherein said displaying step (b) comprises the step of on-screen displaying a channel map in a predetermined portion of a monitor screen, said channel map including all of said channel numbers, wherein said each of said channel numbers having an associated broadcast signal is distinctively displayed so as to permit identification of all of said active channel numbers.

* * * * *